Sept. 21, 1971          R. B. POTTER          3,606,627
LIP LATCHING MECHANISM FOR A DOCKBOARD
Filed Jan. 26, 1970          3 Sheets-Sheet 2
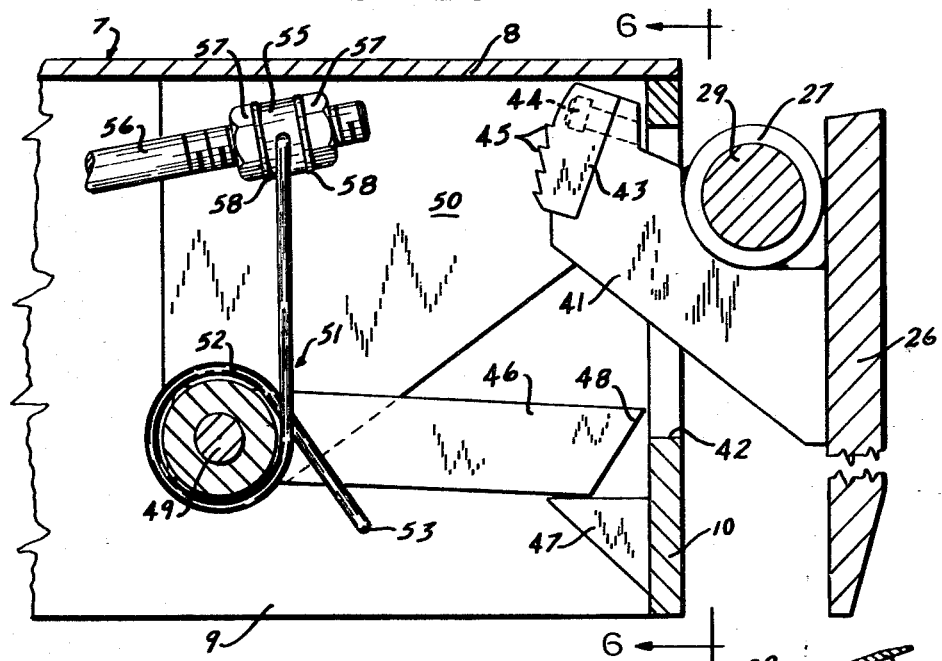
FIG_3
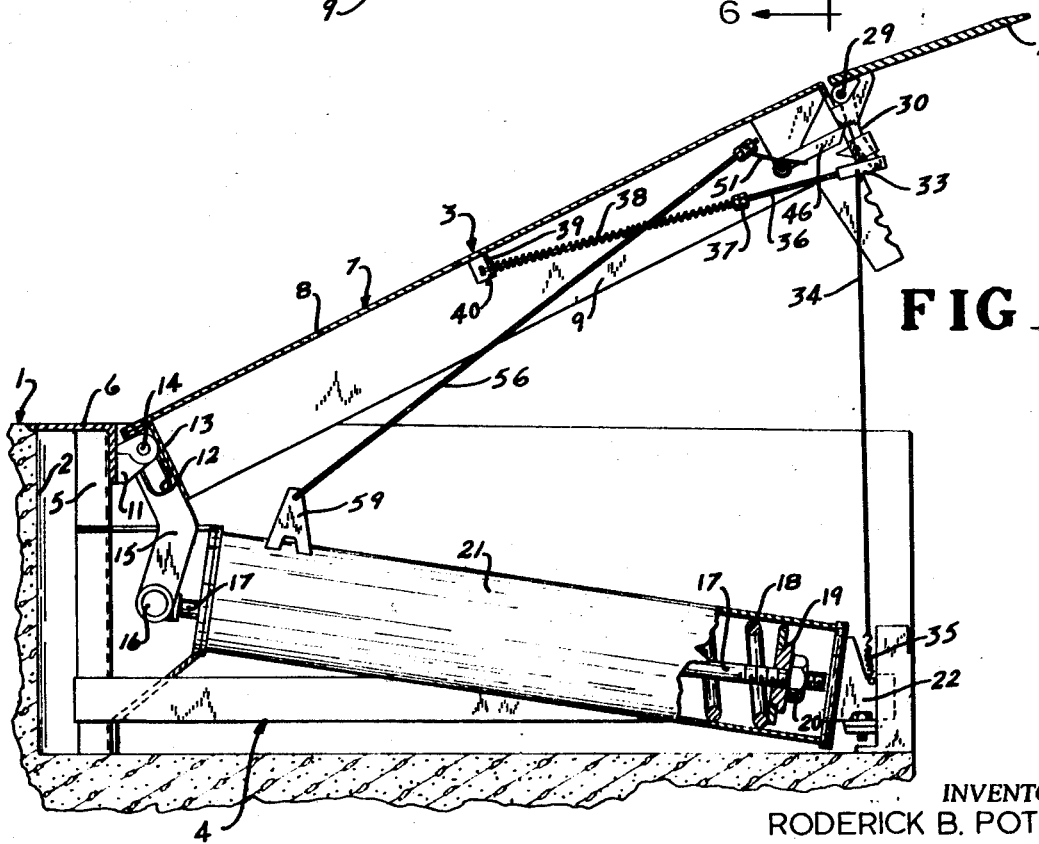
FIG_4
INVENTOR.
RODERICK B. POTTER
BY
Attorneys Sept. 21, 1971 R. B. POTTER 3,606,627
LIP LATCHING MECHANISM FOR A DOCKBOARD
Filed Jan. 26, 1970 3 Sheets-Sheet 3
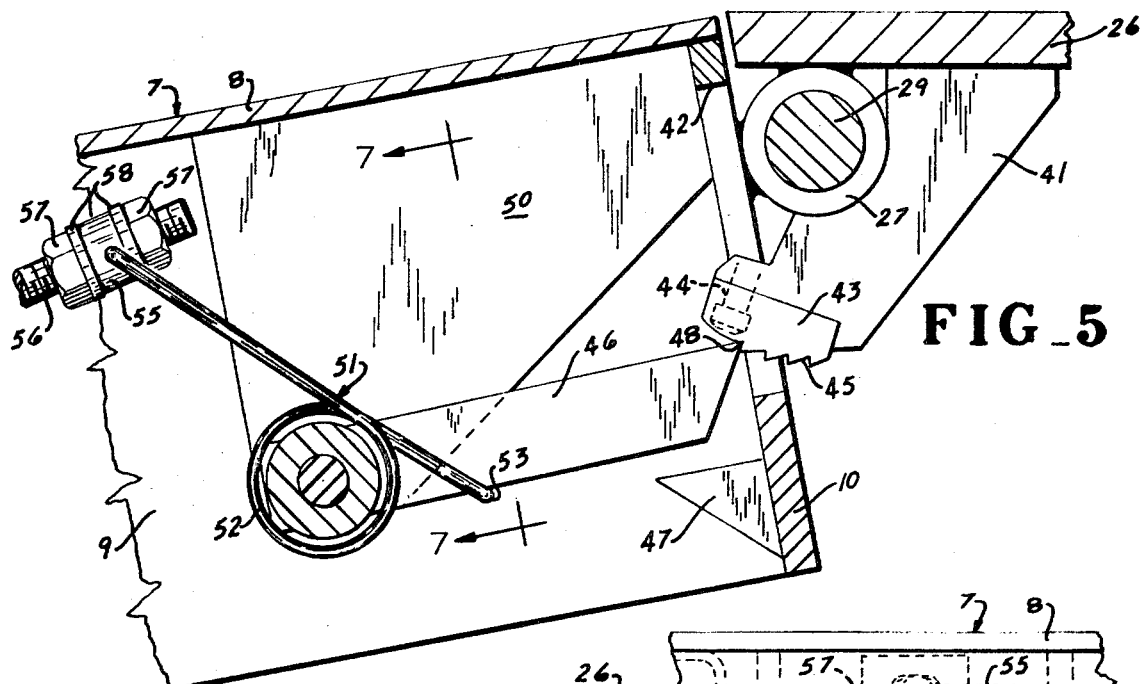
FIG_5
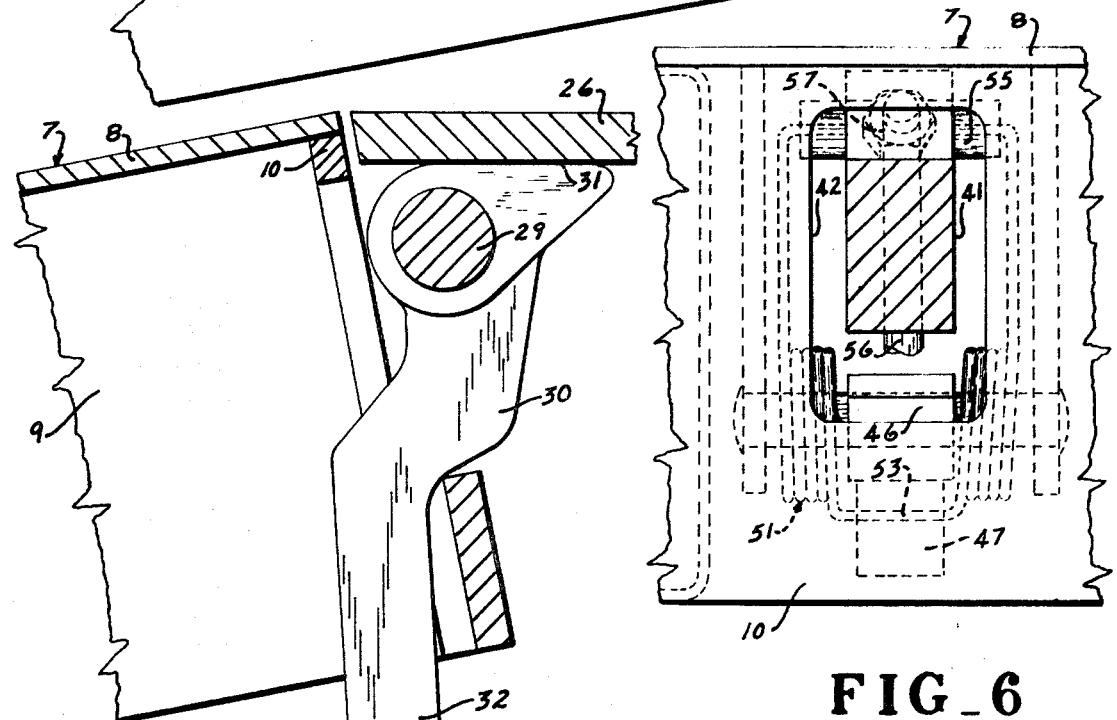
FIG_6
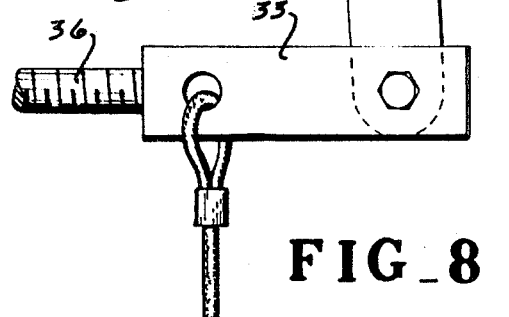
FIG_8
INVENTOR.
RODERICK B. POTTER
BY
Andrus, Sceales, Starke, & Sawall
Attorneys

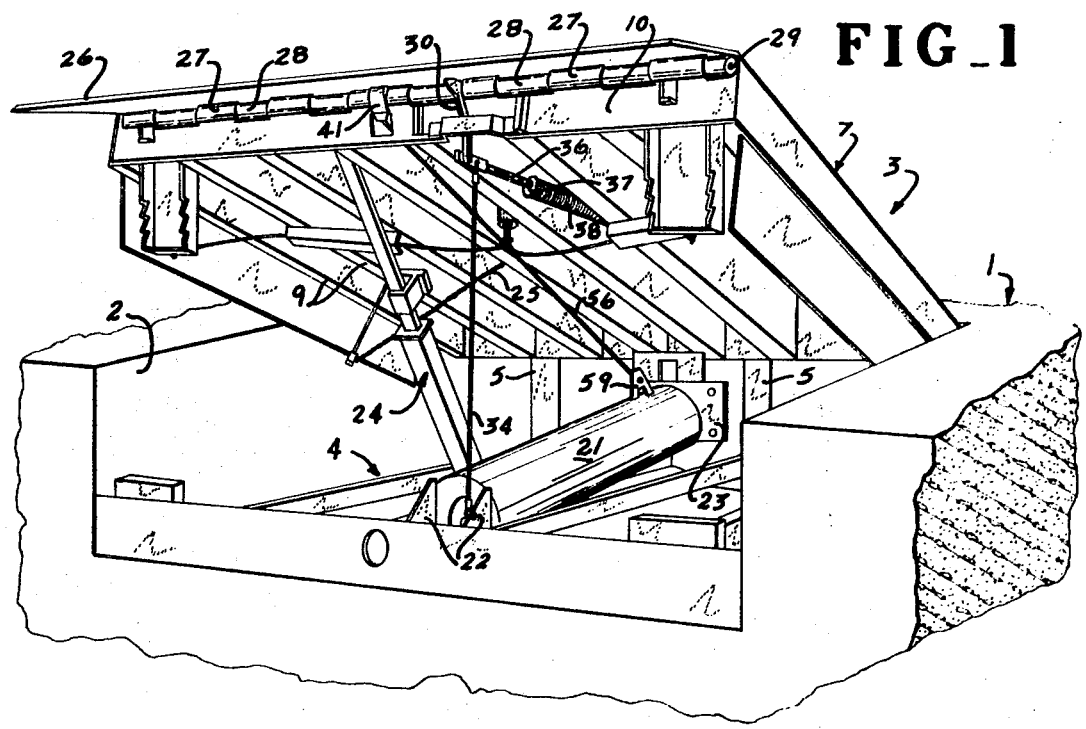
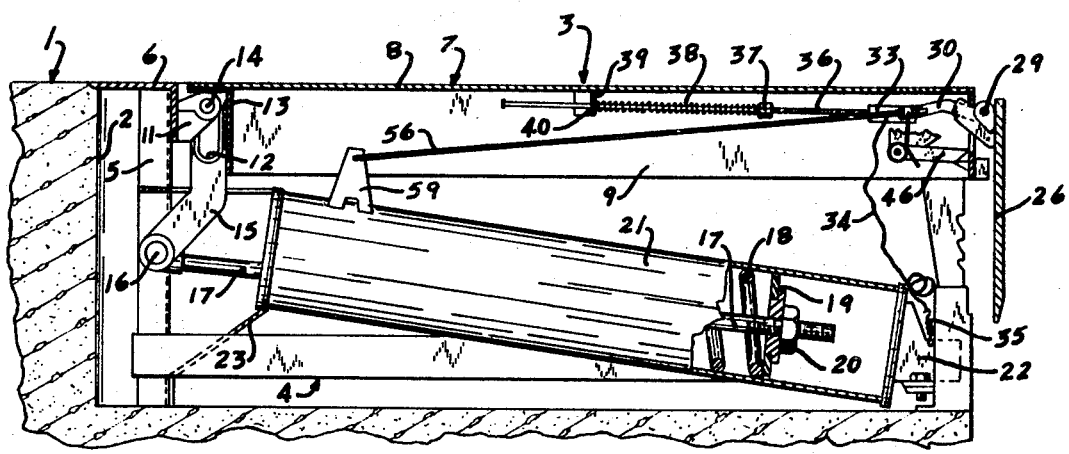
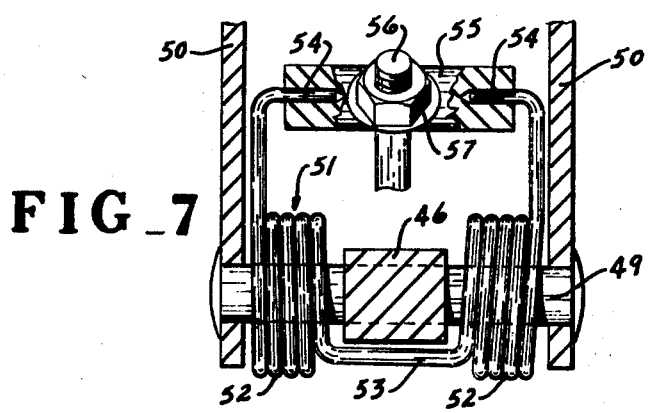

United States Patent Office 3,606,627
Patented Sept. 21, 1971

3,606,627
LIP LATCHING MECHANISM FOR A DOCKBOARD
Roderick B. Potter, Milwaukee, Wis., assignor to
Kelley Company, Inc., Milwaukee, Wis.
Filed Jan. 26, 1970, Ser. No. 5,864
Int. Cl. B65g *11/00*
U.S. Cl. 14—71      11 Claims

ABSTRACT OF THE DISCLOSURE

An improved lip latching mechanism for a dockboard adapted to span the gap between a loading dock and the bed of a carrier. The dockboard includes a ramp mounted on the dock and an extension lip is hinged to the forward edge of the ramp and is movable with respect to the ramp from a pendant position to an extended position. When the ramp is elevated the lip is pivoted to the extended position and simultaneously a lip latch is pivoted into engagement with one of a series of notches on a lug attached to the undersurface of the lip to hold the lip in the extended position. The lip latch is moved to the operative position by a control rod having one end connected to the supporting structure and the opposite end acts through a torsion spring against the latch. As the ramp is lowered, the spring force on the latch is withdrawn enabling the latch to pivot by gravity to its inoperative position.

---

This invention relates to a dockboard to be installed on a loading dock and more particularly to a lip latching mechanism for holding the extension lip in an extended position with respect to the ramp.

A common form of dockboard is installed in a shallow depression or pit in the upper surface of the dock. A dockboard of this type includes a ramp which is hinged at its rear edge to the back of the dock pit and is adapted to be biased upwardly to an inclined position by a coil spring or other resilient means. When not in use, the ramp is locked or held down in a cross traffic position generally flush with the upper surface of the dock by a manually releasable holddown mechanism.

The conventional dockboard also includes an extension lip hinged to the forward edge of the ramp. When a truck or other carrier backs towards the dock, the operator releases the hold down mechanism so that the ramp will pivot upwardly to the inclined position. As a consequence of the upward pivotal movement of the ramp, a lip lifting mechanism is actuated to pivot the lip upwardly to a partially extended position. Simultaneously a lip latching mechanism is operated which engages the lip and holds it in the partially extended position. The operator then walks outwardly on the inclined ramp and his weight will overbalance the force of the spring to lower the ramp and move the lip into engagement with the bed of the carrier. As the lip engages the carrier, it is moved to its fully extended position, thereby releasing the lip holding latch. After the loading or unloading is completed, the carrier then merely pulls away from the dock and the lip will pivot downwardly to its pendant position.

In the conventional type of dockboard, such as that shown in U.S. Pat. 3,203,003, both the lip lifting mechanism and the lip latching mechanism are operated through a cable which is attached to the frame or supporting structure. As the ramp is elevated the cable becomes taut to thereby operate the lip lifting mechanism and simultaneously move the lip latch into the operative or latching position. With a cable operated mechanism, such as that shown in the abovementioned patent, it is difficult to precisely adjust the position at which the lip latch will move to the operative position. Adjustment can be made by varying the location of attachment of the lip latch cable to the main cable connected to the lip lifting mechanism, but this adjustment is not precise or accurate.

It has also been found that during service the force of the spring or other counterbalancing mechanism which is used to counter balance the lip may decrease in force, with the result that the lip may not be extended to a position where it can be engaged by the latch. Moreover foreign material may accumulate between the end of the lip and the adjacent edge of the ramp which also may prevent the lip from pivoting to a position where it can be engaged by the latch. When these conditions arise, the lip latch will be unable to hold the lip in the extended position.

The present invention is directed to a lip latching mechanism which operates independently of the lip lifting mechanism and overcomes the difficulties encountered with the prior construction. More specifically, the lip latching mechanism includes a lug secured to the undersurface of the lip and provided with a series of abutments or notches. A latch is mounted for pivoting movement on the ramp and when pivoted to the operative position is adapted to engage one of the abutments on the lug to hold the lip in the partially extended position.

To move the latch to the operative or latching position, one end of a control rod is connected to the supporting structure or frame of the dockboard and the opposite end of the rod is connected through a torsion spring to the latch. On elevation of the ramp, the rod will pivot to move the torsion spring into engagement with the latch to lift the latch into engagement with one of the abutments on the lug to hold the lip in the partially extended position. As the ramp is lowered, the control rod will move the torsion spring out of engagement with the latch but as the weight of the lip bears on the end of the latch, the latch will be maintained in the latching or operative position. When the ramp lowers to position where the lip comes to bear on the bed of a carrier and is pivoted to the fully extended position, the lug will be moved out of engagement with the latch and the latch will thereby fall by gravity to the inoperative position.

Adjustment of the location whereat the latch will begin its movement to the operative position can be readily made by varying the position of attachment of the torsion spring on the control rod. This adjustment is readily accomplished by threading a block, which is attached to the end of the spring, along the control rod.

As the lug on the lip is provided with a series of abutments or teeth, one of which will be engaged by the latch, it insures that the lip will be locked even though there may be a lack of lip counterbalance, misoperation of the lip lifting mechanism or an accumulation of foreign material which may prevent the lip from swinging to its extended position. The teeth or abutments on the latch are set at approximately 5° intervals of lip pivot, so that locking of the lip can be assured when the lip is within an angle of 10° to 25° with rspect to its fully extended position.

The operation of the lip latch is completely independent of the lip lifting cable. By operating through the control rod as a direct result of the ramp position, a more positive action is provided.

As a further advantage adjustment of the latch is accomplished without critical settings as a lost motion connection is incorporated through use of the torsion spring.

Other objects and advantages will appear in the course of the following description.

The drawings illustrate the best mode presently contemplated of carrying out the invention.

In the drawings:

FIG. 1 is a perspective view of a dockboard incorporating the lip latching mechanism of the invention;

FIG. 2 is a vertical section showing the dockboard in the cross traffic position;

FIG. 3 is an enlarged fragmentary vertical section showing the lip and lip latching mechanism when the ramp is in the cross traffic position;

FIG. 4 is a view similar to FIG. 2 showing the ramp in the inclined position with the lip partially extended;

FIG. 5 is a view similar to FIG. 3 showing the lip in the partially extended position;

FIG. 6 is a section taken along line 6—6 of FIG. 3;

FIG. 7 is a section taken along line 7—7 of FIG. 5; and

FIG. 8 is an enlarged fragmentary view showing the lip lifting mechanism.

The drawings illustrate the loading dock 1 formed with a shallow pit or depression 2 and the dockboard 3 of the invention is installed in the pit.

The dockboard 3 is provided with a structural mounting frame 4 which is mounted in the pit and the rear portion of the frame includes a series of spaced vertical channels 5 that carry a horizontal angle 6. The upper flange of angle 6 is substantially flush with the upper surface of dock 1.

Dockboard 3 also includes a ramp 7 and the rear edge of the ramp is hinged to the angle 6 of frame 4. Ramp 7 is composed of a generally flat tread plate 8 which is supported by a series of channel shaped parallel beams 9 and the forward edges of the beams 9 are welded together by a front plate 10.

To hinge the rear edge of the ramp 7 to the angle 6 two pairs of lugs 11 are welded to the angle 6 and the lugs 11 straddle a U-shaped member 12 welded to the angle 13 at the rear of the ramp. Hinge pins 14 extend through the aligned openings in the lugs 11 as well as through the central slot in the U-shaped members 12. With the slotted connection provided by the U-shaped member 12, the rear edge of the ramp can shift vertically to compensate for variations in level of the bed of the carrier truck, thereby enabling the ramp to tilt slightly in the event the bed of the carrier is at a slight angle to the horizontal.

The ramp is biased upwardly to an inclined position by a counterbalancing mechanism similar to that described in the copending U.S. patent application Ser. No. 770,054 filed Oct. 23, 1968, now Pat. No. 3,528,118. The counterbalancing of the mechanism includes a lever arm 15 which is welded to the rear angle 13 and the lower end of the lever arm is pivotally connected by a pin 16 to the rear end of a rod 17. Rod 17 extends through the coil spring 18 and the forward end of the rod is retained within an opening in a movable spring retainer 19 by a nut 20 that is threaded on the end of the rod. Coil spring 18 is retained within an outer tubular sleeve 21 and the forward end of the sleeve 21 is secured to the frame 4 of the dockboard by a supporting structure 22, while the rear end of the sleeve is similarly secured to the frame by a supporting structure 23. With this construction, the force of the spring 18 acts to urge the rod 17 forwardly and thereby pivot the lever arm 15 to bias the ramp to the inclined position, as shown in FIG. 4.

The dockboard includes a conventional hold-down or locking mechanism indicated generally by 24 which can be similar to that shown in U.S. Pat. Nos. 3,137,017, 3,117,332, or Re. 25,247. The hold-down mechanism 24 retains the ramp in the horizontal or cross traffic position and when the hold-down mechanism is manually released by the operator through operation of the cable 25, the force of the spring 18 will act through the lever arm 15 to pivot the ramp upwardly to the inclined position. Subsequently, when the operator walks forwardly on the ramp, the weight of the operator will over-balance the force of the spring 18, thereby causing the ramp to pivot downwardly and the hold-down mechanism will automatically hold the ramp in this downward position.

An extension lip 26 is pivotedly connected or hinged to the forward edge of the ramp 7. To provide the hinge connection a series of hinge sockets 27 are welded to the undersurface of the lip and a second series of aligned hinge sockets 28 are welded to the front plate 10 of the ramp. Hinge pins 29 extend through the aligned sockets 27 and 28 to provide the hinge connection between the lip 26 and the ramp 7. In the storage or cross traffic position, as illustrated in FIG. 2, the lip will assume a pendant position in which it hangs downwardly in front of the ramp. As the ramp is pivoted upwardly to an inclined position, as illustrated in FIG. 4, the lip 26 will be automatically pivoted outwardly to a partially extended position by a lip lifting mechanism.

The mechanism employed for lifting the lip to the extended position as the ramp is moved upwardly can be similar to that shown in U.S. Patent 3,203,002. As best illustrated in FIG. 8, the lip lifting mechanism includes an arm 30 which is mounted for rotation about the hinge pin 29 and is provided with a generally flat surface 31 that is adapted to engage the undersurface of the lip. The arm 30 can be considered a crank arm and when the lip is in the pendant position the end 32 of arm 30 is located beneath the tread plate 8 of the ramp. The end 32 is pivotally connected to a clevis 33, and the upper end of a cable 34 is also attached to the clevis while the lower end of the cable is connected through a spring 35 to the supporting frame 4 of the dockboard. When the ramp is in the cross traffic position the cable 34 is in a limp condition. As the ramp is elevated through the action of the counterbalancing spring 18, the cable 34 will become taut and as the ramp is elevated to a predetermined position, the cable 34 will pivot the arm 30 downwardly to the position shown in FIG. 8, to thereby pivot the lip 26 to the partially extended position.

To aid in moving the lip 26 to the extended position, a lip counterbalancing system is employed which can be similar to that described in U.S. Patent 3,203,002. The counterbalancing system includes a rod 36 which is connected to the clevis 33 and is located beneath the tread plate of the ramp. A pair of stop nuts 37 are threaded on the central portion of the rod 36 and a compression spring 38 is located around the rod and extends between the stop nuts 37 and an abutment 39 attached to the undersurface of the tread plate. The inner end of the rod 36 extends through a hole 40 in the abutment.

When the lip is in the pendant position, as illustrated in FIG. 2, the rod 36 is in substantial alignment with the end portion 32 of the arm 30 so that the force of the spring 38 will not act to pivot the arm. However, as the ramp is raised and the arm 30 is pivoted downwardly by the taut cable 34 to an undercenter position, the force of the spring 38 will then act to pivot the arm 30 to the position shown in FIG. 8 and thereby assist in raising the lip to the partially extended position.

According to the invention the lip is held in the partially extended position by an improved lip latching mechanism. The lip latching mechanism includes a lug 41 which is secured by welding to the undersurface of the lip 26, and the inner end of the lug extends through an opening 42 in the front plate 10 of the ramp. An insert 43 is mounted on the end of the lug 41 by a stud 44, and the insert is provided with a series of notches or teeth 45 that are adapted to be engaged by a latch 46 to hold the lip in the partially extended position. The latch 46 is movable between an inoperative position, in which it is supported on the upper end of a stop 47 secured to the front plate 10 of the ramp, to an upper latching or operative position where the forward tip 48 of the latch engages one of the series of teeth 45.

To mount the latch 46 for a pivoting movement the inner end of the latch is secured to a horizontal shaft 49 that is journaled between a pair of parallel plates 50 which extend downwardly from the tread plate 8. The latch 46 is adapted to be moved to the operative or latching position by a torsion spring 51 having a pair of coiled end sections 52 that are mounted around the shaft 49 on opposite sides of the latch 46. The spring 51 also includes a central section 53 which connects the coiled end sections 52 and is located beneath the latch 46.

As best illustrated in FIG. 7 the upper bent ends 54 of the torsion spring 51 are received in openings in the opposite ends of a slide bar 55 which is mounted on the end of a control rod 56. The position of attachment of the bar 55 to the control rod 56 can be varied by a threaded adjustment of lock nuts 57. Washers 58 can be located between lock nuts 51 and slide bar 55.

The rear of the control rod 56 is pivotally connected to a mounting bracket 59 secured to the sleeve 21. The attachment of the control rod 56 to the sleeve is not critical and the rear end of the control rod can be attached to any portion of the supporting structure of the dockboard.

When the ramp is in the lower or cross traffic position, as shown in FIG. 2, the lip 26 will be in the pendant position and the lip latch 46 will be in the inoperative position supported on the stop 47 as shown in FIG. 3. In this position the central section 53 of the torsion spring will be spaced beneath the latch 46. When the hold-down mechanism is released and the ramp is pivoted upwardly through the counterbalancing effect of the coil spring 18, the cable 34 will become taut to pivot the arm 30 to an undercenter position where the coil spring 38 will then aid in pivoting the arm 30 downwardly to thereby pivot the lip upwardly to the partially extended position. Simultaneously upward movement of the ramp will move the control rod 56, rearwardly with respect to the ramp, from the position shown in FIG. 3 to the position shown in FIG. 5. This movement of the control rod 56 will act to move the central portion 53 of the spring 51 into engagement with the lower surface of the latch 46 to thereby move the latch upwardly into engagement with one of the teeth 45. Due to the fact that the central section 53 of torsion spring 51 is spaced beneath the latch a lost-motion type of connection is provided, whereby initial movement of the rod 56 will not act to move the latch 46 and the latch will only be moved after a predetermined amount of movement of the rod, or until the central section 53 of the spring is brought into engagement with the latch.

With the lip in the partially extended position, as shown in FIG. 5, the operator will walk down the ramp, causing the ramp to pivot downwardly. This motion will tend to move the control rod 56 from the position shown in FIG. 5 to the position shown in FIG. 3, and thereby move the section 53 torsion spring 52 out of contact with the latch 46. However the latch will remain engaged with the teeth 45 due to the fact that the weight of the lip 26 acting against the tip 48 of the latch will maintain the engagement.

As the ramp 7 is further lowered, the lip 26 will engage the bed of a truck or carrier causing the lip to pivot upwardly to the fully extended position and release the engagement between the teeth 45 and the tip 48 of the latch 46. The latch will then be free to pivot downwardly by gravity to the inoperative position where it rests on the stop 47.

The lip latching mechanism of the invention is controlled independently of the lip lifting cable 34. This not only increases the reliability of operation but the sequence of relative movement between the lip 26 and the latch 46 can be more precisely controlled. By adjustment of the position of block 55 on rod 56 the spacing of section 53 of spring 51 beneath latch 46 can be varied and this in turn will determine the timing of operation between the latch and the lip and ramp.

As the lug on the lip is provided with a series of abutments or teeth, latching of the lip is assured even though the lip is prevented from pivoting to its normal extended position due to a lessening of the lip counterbalancing force or due to lodging of foreign material between the edge of the lip and the ramp.

If the unit is properly balanced the latch 46 will normally engage the uppermost of the teeth 45 thereby locking the lip at an angle of approximately 10° from its fully extended position. The remaining teeth are set at approximately 5° intervals of lip pivot so locking of the lip is assured anywhere from 10° to 25° of lip pivot.

The torsion spring 52 will gain torsion as the ramp moves upwardly due to the control rod 56 moving rearwardly and this additional torsion will insure that the latch 46 will be moved upwardly into engagement with the teeth 45, on the lug as the lip begins to rise.

While the above structure has been shown associated with a dockboard adapted to be mounted in a pit it is contemplated that the lip latching mechanism may be associated with any type of dockboard having an extendable lip which is adapted to be locked in a partially extended position.

Various modes of carrying out the invention are contemplated as being within the scope of the following claims particularly pointing out and distinctly claiming the subject matter which is regarded as the invention.

I claim:

1. In a dockboard having a ramp mounted on a stationary supporting structure and having an extension lip hinged to an end of the ramp and having a lip lifting mechanism for lifting the lip from a pendant position with respect to the ramp to an extended position forming substantially an extension of the ramp, an improved lip latching mechanism for latching the lip in the extended position, comprising a first latch member connected to the lip, a second latch member mounted for movement on the ramp between an inoperative position and an operative latching position, one of said latch members having a series of notches and the other latch member having an abutment to engage one of said notches when the second latch member is in the latching position and hold the lip in the extended position, and actuating means for moving the second latch member from the inoperative position to the operative position, said actuating means comprising a rigid member connected to the supporting structure, and resilient means connecting said rigid member and said second latch member, said actuating means being separate from said lip lifting mechanism.

2. The structure of claim 1, wherein said resilient means is disposed out of contact with said second latch member when the lip is in the pendant position so that initial upward movement of the ramp does not act to move said second latch member and that subsequent upward movement of the ramp acts to move said resilient means into contact with said second latch member and move said second latch member to the operative latching position.

3. The dockboard of claim 1, wherein the first latch member is provided with said series of notches and said second latch member has said abutment.

4. In a dockboard having a ramp mounted on a stationary supporting structure and having an extension lip hinged to the front end of the ramp for movement between a pendant position with respect to the ramp and an extended position forming substantially an extension of the ramp, an improved lip latching mechanism for latching the lip in the extended position, comprising a first latch member connected to the underside of the lip, a second latch member pivotally connected to the ramp and movable between an inoperative position and an operative latching position, one of said latch members having a series of notches and the other latch member having an abutment to engage one of said notches when the second latch member is in the latching position and hold the lip in the extended position, a control rod having one end pivotally connected to the supporting structure, and a torsion spring connected to the opposite end of said rod, the said torsion spring having a first portion spaced out of contact with the second latch member when the second latch member is in the inoperative position and disposed to engage the second latch member in response to a predetermined amount of upward movement of the ramp to thereby move the second latch member from the inoperative to the operative latching position.

5. The apparatus of claim 4, and including means for biasing the second latch member to the inoperative position when the abutment is moved out of engagement with the notch as a consequence of further pivotal movement of the lip to a fully extended position.

6. The apparatus of claim 4, wherein the spacing between adjacent notches is correlated with a predetermined degree of pivotal movement of the lip.

7. The dockboard of claim 4, wherein said series of notches includes a first notch at one end of said series and a second notch at the other end of said series, said first notch being positioned with respect to the lip so that the lip will be at an angle of about 10° from its fully extended position when the abutment is engaged with said first notch, and said second notch being positioned with respect to the lip so that the lip will be at an angle of about 25° from its fully extended position when the abutment is engaged with said second notch.

8. The apparatus of claim 4, and including a shaft for pivotally connecting the second latch member to the ramp, said torsion spring including a coiled section disposed around said shaft and having an end portion disposed on the opposite side of the coiled section from said first portion, said end portion being connected to said control rod.

9. The apparatus of claim 8, and including a connecting member for connecting said end portion of said spring to the rod, said connecting member being selectively movable along the length of said rod to vary the spacing of said first portion of the spring from the second latch member when the latch is in the inoperative position.

10. The apparatus of claim 8, wherein said torsion spring also includes a second coiled section disposed around the shaft and said first portion connects the coiled section.

11. The apparatus of claim 9, and including lock means for locking the connecting member with respect to the rod.

References Cited
UNITED STATES PATENTS

| | | | |
|---|---|---|---|
| 2,974,336 | 3/1961 | Kelley | 14—71 |
| 3,199,133 | 8/1965 | Ramer | 14—71 |
| 3,203,002 | 8/1965 | McGuire | 14—71 |
| 3,204,270 | 9/1965 | Fenton | 14—71 |
| 3,335,442 | 8/1967 | Kumpolt | 14—71 |

JACOB L. NACKENOFF, Primary Examiner